May 22, 1951 W. T. PEIRCE 2,553,938
METHOD AND APPARATUS FOR CONTINUOUSLY VULCANIZING
THE RUBBER COVERING OF CONDUCTORS
Filed Feb. 17, 1948 2 Sheets-Sheet 1
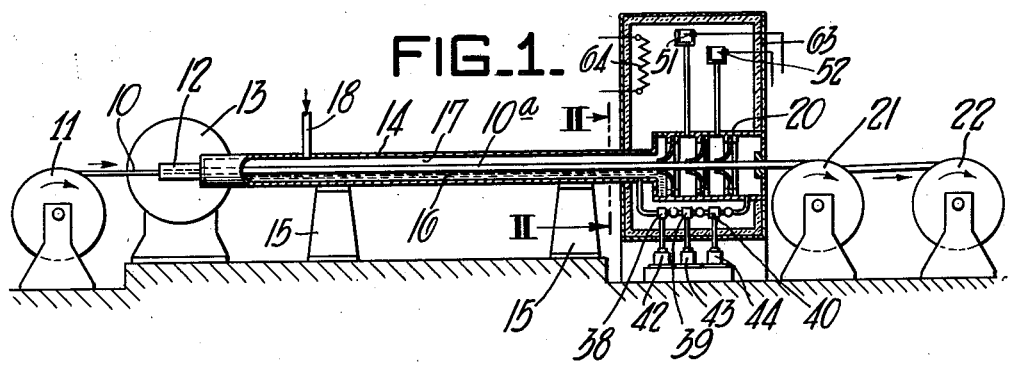
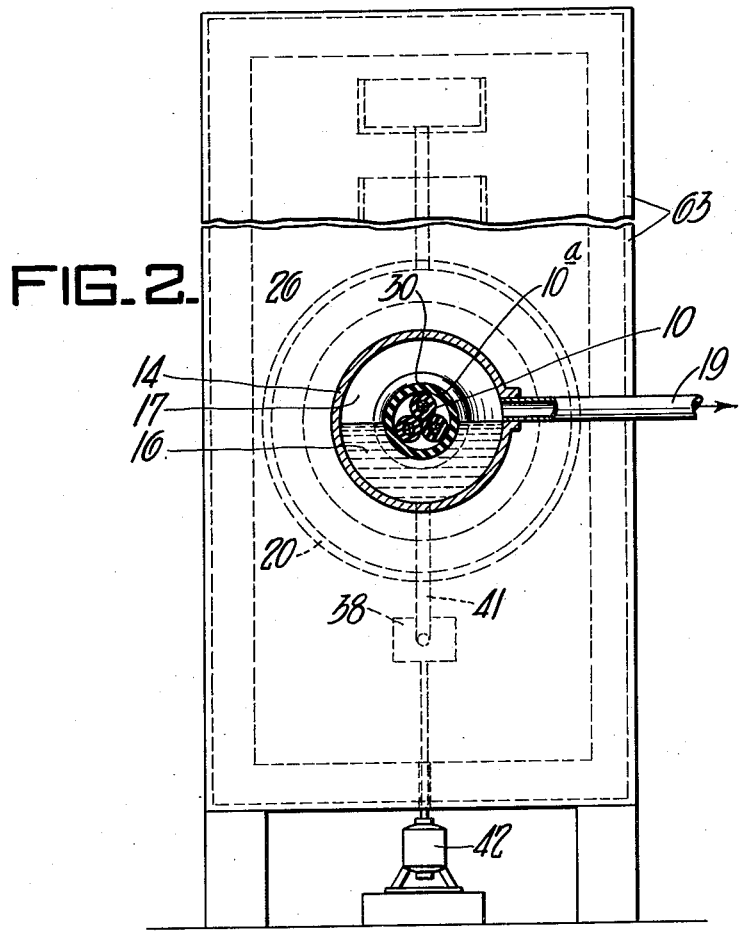
INVENTOR:
WALTER T. PEIRCE,
BY:
Donald G. Dalton
his Attorney.

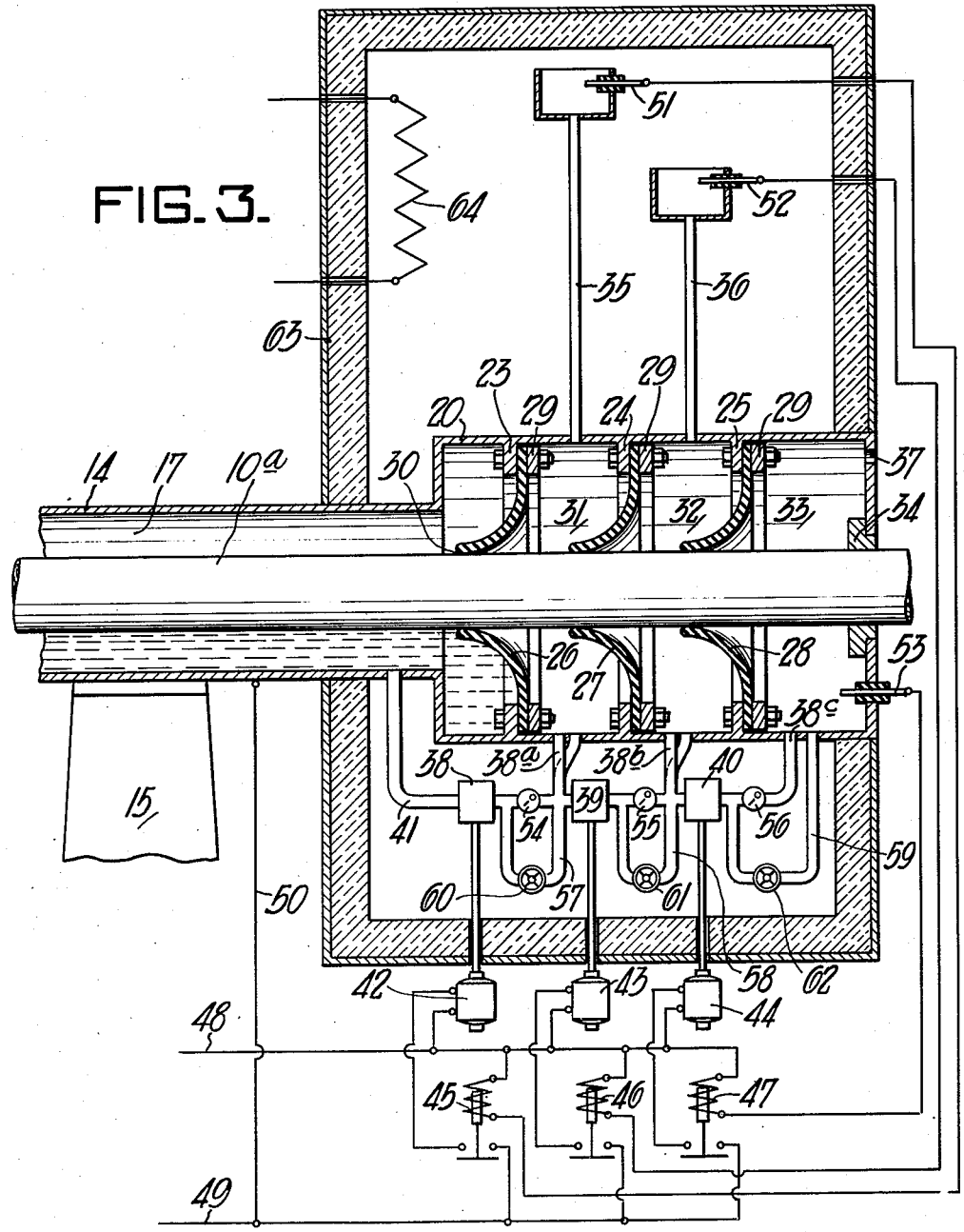

Patented May 22, 1951

2,553,938

UNITED STATES PATENT OFFICE 2,553,938

METHOD AND APPARATUS FOR CONTINUOUSLY VULCANIZING THE RUBBER COVERING OF CONDUCTORS

Walter T. Peirce, Worcester, Mass., assignor to The American Steel and Wire Company of New Jersey, a corporation of New Jersey Application February 17, 1948, Serial No. 8,765

17 Claims. (Cl. 18—6)

This invention relates to the manufacture of electric conductors having an insulating covering or sheath of rubber or like material thereon and, in particular, to the continuous vulcanizing or curing of such covering after it has been applied by the usual process of extrusion.

The continuous vulcanization of the rubber covering of conductors has heretofore been carried out by drawing the conductor longitudinally through an elongated tubular heating chamber (usually extending from the outlet of the die of ing is applied) containing steam under substantial pressure. Such operations have always been attended with considerable difficulty. In the first place, the sealing of the opening through which the conductor emerges from the elongated tubular vulcanizing chamber (wherein the pressure may be as high as 200 pounds) against leakage of steam presents a serious problem, particularly because of the number of different sizes of conductors to be processed. In addition, when the conductor is a cable of substantial size, i. e., greater than 1" in diameter, its weight is such that it drags on the bottom of the chamber because of the great span between the points of support at the ends thereof, resulting in abrasion of the covering leaving its appearance unsightly. This is objectionable because many cables are installed without other covering than vulcanized rubber. Attempts have been made to solve this problem by mounting supporting rollers in the chamber spaced along the length thereof but this introduced a further difficulty, viz., keeping the rollers lubricated under the temperatures required for vulcanizing. Moreover, such rollers tend to drag and injure the conductor covering unless they conform closely to the curvature thereof.

I have invented a novel method and apparatus for continuously vulcanizing electric conductors which overcome the aforementioned difficulties. My invention affords an effective seal for the outlet end of the chamber and uniform support of the conductor free from frictional contact with the chamber or other supports at any point. In a preferred embodiment and practice, I provide the elongated tubular vulcanizing chamber with a partial filling of a material which is liquid at the temperatures required for vulcanizing and has sufficient density to cause the conductor to float therein, thus preventing frictional engagement of the conductor with the chamber. One example of such material is the alloy known as Wood's metal. I also provide a series of flexible sealing collars at the outlet end of the chamber for wiping engagement with the conductor. These collars are mounted in a sealing box and define separate compartments or liquid locks for effecting a gradual reduction of the pressure on the conductor and for collecting any liquid leaking past the collars. A thin film of liquid adhering to the conductor increases the effectiveness of the sealing collars. I also provide pumps for returning such leakage to the chamber and automatic control means for the pumps. Standpipes of graduated heights extend upwardly from the compartments insuring the maintenance of the desired pressure therein and the reduction of pressure from one compartment to the next by predetermined decrements. At the outlet from the last sealing compartment I provide a stripping die for removing any metal remaining adherent to the conductor.

A complete understanding of the invention may be obtained from the following detailed description and explanation which refer to the accompanying drawings illustrating a preferred practice and embodiment. In the drawings, Figure 1 is a view, largely diagrammatic, with parts in elevation and parts in vertical longitudinal section, showing the general arrangement of the apparatus employed;

Figure 2 is a transverse section taken along the plane of line II—II of Figure 1; and Figure 3 is a section taken along the plane of line III—III of Figure 2, or alternatively may be considered as an enlargement of a portion of Figure 1.

Refering in detail to the drawings, a bare conductor 10 to be coated is unrolled from a spool 11 and passed through the die 12 of an extruding press 13 which progressively applies thereto a continuous coating or sheath of insulating material, such as a mix including uncured rubber or other material adapted to be cured by heat. An elongated tubular curing chamber 14 extends horizontally from the outlet to the die 12, being mounted on suitable supports 15. The chamber 14, as shown in Figure 2, is filled to about the median horizontal plane with a material 16 which is liquid at curing temperature, i. e., around 250°, and has sufficient density to float the coated conductor as it is drawn therethrough by means to be described later. One example of such material is Wood's metal consisting of approximately 50% bismuth, 25% lead, 12½% tin and 12½% cadmium, having a melting point of about 150° F. Other low-melting lead or bismuth alloys may be used, or even pure lead under certain conditions. The chamber 14 is only partially filled with the flotation material 16, as stated, in order to prevent contact between the conductor and the top of the chamber and to leave a vapor space 17 thereabove for the circulation of a heating medium, such as steam under suitable pressure. The chamber 14 is provided with a steam inlet connection 18 at one end and an outlet connection 19 adjacent the other end.

The conductor 10 in the example illustrated, as shown in Figure 2, is a three-conductor cable and the insulating sheath thereon to be cured is designated 10ª. The chamber 14, of course, is heated by circulating steam to a temperature above the melting point of the material 16 so that the conductor in passing through the chamber is supported intermediate the ends thereof by flotation on the liquid. Wood's metal has a specific gravity of 9.7 which is sufficient for this purpose. The sheath 10ª of the conductor is cured progressively, the speed of travel and the length of the chamber being so correlated that curing is substantially completed by the time any given point on the conductor reaches the right-hand end of the chamber. The conductor with its sheath fully cured emerges from the chamber 14 through a sealing box 20. It passes around a capstan 21 which serves to draw the conductor through the curing chamber and is then coiled on a spool 22. The capstan and spool are provided with suitable driving means (not shown).

The sealing box 20 may conveniently be cylindrical and coaxial with the chamber 14. It has inwardly extending flanges 23, 24 and 25 spaced therealong. Flexible sealing collars 26, 27 and 28 are secured to these flanges by clamping rings 29. The collars are generally frusto-conical and have central openings of a size to fit snugly the conductor sheath 10ª, as indicated at 30. The collars may be of rubber or like material, and are preferably elastic so their openings may stretch or contract as necessary to accommodate conductors of a reasonable range of sizes.

As the conductor 10 travels through the chamber 14, it picks up an adherent film of the molten metal 16. This film tends to fill any small openings between the conductor and the interior of the sealing collars resulting from irregularities in their surfaces, thereby improving the sealing effect of the collars. The passage of the conductor through the openings in the sealing collars, however, pulls a limited amount of the molten metal adhering as a film to the conductor, past the collars and into the compartments or liquid locks 31, 32 and 33 defined thereby, each collar serving to strip off some of the adherent metal which accumulates in the compartments. At the outlet end of the box 20 a close-fitting stripping die 34 removes the last vestige of molten metal adhering to the conductor. It is preferably provided with heating means such as an electric resistor (not shown).

The liquid locks 31 and 32 are provided with standpipes 35 and 36 extending upwardly therefrom, respectively, to heights appropriate for the pressure desired in each compartment. If the pressure maintained in the chamber 14 be 150 lbs. per square inch, for example, the standpipe 35 may be of a height sufficient to maintain a pressure of 100 pounds per square inch in compartment 31, and standpipe 36 may be of a height sufficient to maintain a pressure of 50 lbs. per square inch in compartment 32. The compartment 33 may be operated at atmospheric pressure by providing a vent 37 near the top thereof. The pressure differential between adjacent compartments aids in seating the collar therebetween against the conductor.

Continuous drawing of the conductor through the sealing collars causes slight leakage and an accumulation of metal in the compartments as aforesaid. To take care of this accumulation, I provide pumps 38, 39 and 40 adapted to return molten metal from the several compartments to the chamber 14 by a return pipe 41. The pumps are connected in series, each having a connection for drawing metal from one of the compartments, the connections being designated 38ª, 38ᵇ and 38ᶜ, respectively. This reduces the head or back pressure against which the pumps work and insures maintenance of the desired height of molten metal in standpipes 35 and 36 at all times. The pumps are driven by individual motors 42, 43 and 44. The motors are controlled by contactors 45, 46 and 47, respectively. One terminal of each of the motors is connected to one side 48 of a supply bus. One terminal of the operating coil of each of the contactors is likewise connected to the same side of this supply bus. The other side 49 of the supply bus is grounded on the chamber 14 by a connection 50, the energizing circuits for the motors being completed to the side 49 through the contacts of the contactors.

Liquid-level contacts 51, 52 and 53 suitably insulated are disposed in the standpipes 35, 36 and the compartment 33 for controlling the energization of the operating coils of the contactors. When the level of the molten metal in the standpipe 35 reaches the contact 51, the circuit for operating the contactor 45 will be completed and motor 42 will be started to pump metal from compartment 31 into chamber 14. The contacts 52 and 53 similarly control the contactors 46 and 47 for energizing the motors 43 and 44, respectively. It will be observed that the pumps 39 and 40 deliver metal to the compartment of next higher pressure by virtue of the series connection of the pumps and not directly to the chamber 14. If the pumps are of the type such as to permit reverse flow therethrough of any substantial amount, check valves 54, 55 and 56 are connected in the inlet lines to the pumps. In order to permit filling of the compartments 31 and 32 to obtain the desired pressure therein when starting operations, by-pass connections 57, 58 and 59 are provided around the check valves 54, 55 and 56. The by-pass connections are controlled by manual valves 60, 61 and 62.

In the control system disclosed, the flotation medium, being a conducting material, serves as part of the control circuits. If a non-conducting flotation medium be employed, the contacts 51, 52 and 53 would be replaced by float-controlled switches. In order to maintain the metal in the standpipes 35 and 36 in molten condition, they and the entire sealing box are enclosed in a housing 63 having a lining of thermal insulation and provided with heating means, such as an electric resistor 64.

If the curing chamber 14 be not connected directly to the extrusion die as shown, a sealing box 20 should also be provided for the entrance end of the chamber. In such additional sealing box, the collars would be disposed with their openings projecting toward the curing chamber. The pumps for the several compartments, furthermore, would be connected to supply molten metal thereto from the chamber 14 to make up for loss of metal drawn through the collars by adherence to the conductor.

It will be apparent from the foregoing that the invention is characterized by numerous advantages over the prior practice and apparatus for vulcanizing or curing an insulating sheath on a conductor. In the first place, the use of a flotation medium for supporting the conductor between the ends of the chamber eliminates abrasion or other injury to the sheath such as would result from contact with mechanical supports, whether fixed or rotary. This insures that the finished product will be delivered with the sheath in perfect condition and free from defects which have characterized the product as made formerly. In the second place, the sealing box and flexible sealing collars provide an unusually effective seal for the exit end of the curing chamber with gradual reduction in pressure by predetermined decrements. At the same time, the small amount of flotation medium drawn through the seals by the travel of the conductor is accumulated in a column to maintain the desired hydrostatic pressure head in the several compartments, and any excess over the desired height is automatically returned to the curing chamber by the motor-driven pumps. In addition, the improved apparatus is simple in construction and operation and the use of a flotation medium for supporting the conductor in the curing chamber does not present any serious practical problem.

Although I have illustrated and described only a preferred embodiment and practice of the invention, it will be recognized that changes in the details and procedure disclosed may be made without departing from the spirit of the invention or the scope of the appended claims.

I claim:

1. In a method of processing an electric conductor or the like having thereon a coating which is cured by heat, such as a mix including uncured rubber, the steps including drawing the conductor through a substantially horizontal chamber, heating the chamber to the temperature desired for curing the coating, and maintaining the chamber partially filled with a material which is liquid at such temperature and has a density enabling it to float the conductor free from contact with the walls of the chamber during its passage therethrough, but leaving a vapor space in the chamber above the surface of the liquid.

2. The method defined by claim 1 characterized by the heating being effected by admitting steam into said vapor space.

3. The method defined by claim 1 characterized by said material being a metal having a melting point below 250° F.

4. The method defined by claim 1 characterized by said material being Wood's metal.

5. In a method of processing an electric conductor or the like having thereon a thermosetting or vulcanizable sheath, the steps including drawing the conductor through a curing chamber, floating the conductor while inside the chamber on the surface of a body of liquid, free from contact with the wall of the chamber, and heating the chamber to a temperature suitable for curing said sheath.

6. The method defined by claim 5 characterized by maintaining a pressure in the chamber above that of the atmosphere, withdrawing the conductor from the chamber through a series of seals and maintaining gradually reducing pressures behind said seals respectively.

7. The method defined by claim 5 characterized by maintaining a pressure in the chamber above that of the atmosphere, and gradually reducing the pressure on the conductor by successive stages as it emerges from said chamber.

8. Apparatus for continuously curing a sheath on a member of indefinite length comprising an elongated chamber, a partial filling of molten metal of specific gravity greater than that of said member in said chamber, a connection from said chamber to a source of gas under super-atmospheric pressure, and means for sealing the exit end of said chamber including a plurality of collars, the space between adjacent pairs of said collars being filled with said molten metal, a vertical tube connected to each of said spaces and means for maintaining the molten metal in said tubes at heights progressively decreasing outwardly from the chamber.

9. In an apparatus for curing a sheath on a metal wire, a horizontal chamber, means for drawing the wire through the chamber, connections between the chamber and a source of heating fluid, sealing means at the exit end of the chamber through which the wire emerges, and a flotation bath of molten metal in the chamber having its surface spaced below the top of the chamber leaving a vapor space above said surface whereby the bath is effective to support the conductor out of contact with the walls of the chamber throughout the length thereof.

10. The apparatus defined by claim 9 characterized by said sealing means including a plurality of liquid locks disposed side-by-side each having a flexible sealing collar wiping the surface of said sheath.

11. The combination with a liquid-containing chamber for continuously processing a member of indefinite length while it travels therethrough, of a sealing box at the outlet end of the chamber, a plurality of spaced seals in the box having wiping engagement with said member and defining separate compartments, return pipes from said compartments extending to said chamber, and pumps connected in said pipes, respectively, for returning liquid accumulating in the compartments to the chamber.

12. The apparatus defined by claim 11 characterized by liquid-level switches for controlling said pumps in accordance with the amount of liquid accumulating in said compartments.

13. The combination with a liquid-containing chamber for continuously processing a member of indefinite length while it travels therethrough, said chamber having a partial filling of molten metal therein, of a sealing box at the outlet end of the chamber, a plurality of spaced seals in the box adapted to make wiping engagement with said member and defining separate compartments of gradually decreasing pressure, standpipes extending upwardly from said chambers, respectively, said standpipes decreasing progressively in height toward the outlet end of the box, a pipe connection from each compartment extending to said chamber, and pump means for returning to the chamber the liquid leaking therefrom past said seals into said compartments.

14. The combination with a liquid-containing chamber for continuously processing a member of indefinite length while it travels therethrough, said chamber having a partial filling of molten metal therein, of a sealing box at the outlet end of the chamber, a plurality of spaced seals in the box adapted to make wiping engagement with said member and defining separate compartments therebetween, and standpipes extending upwardly from said compartments, said standpipes decreasing in height toward the outlet end of the box.

15. The apparatus defined by claim 14 characterized by a stripping die beyond the last seal effective to remove from the member any liquid adhering thereto after passing said seals.

16. The apparatus defined by claim 14 characterized by a pump for returning accumulated liquid from each compartment to said chamber and a liquid-level switch in each standpipe controlling the pump connected to the compartment from which the standpipe extends.

17. The combination with an elongated chamber for continuously processing a member of indefinite length under super-atmospheric temperature and pressure while traveling therethrough, of a liquid partially filling the chamber, said liquid having a specific gravity greater than that of said member and serving as a flotation medium therefor, a sealing box at the exit end of the chamber, a plurality of spaced flexible sealing collars in the box defining separate compartments, each of said collars having an opening snugly fitting said member and wiping the surface thereof, and means connected to each compartment responsive to the pressure of said liquid accumulating therein and effective to relieve such pressures when they exceed predetermined values whereby the pressure in the chamber is stepped down gradually to that of the atmosphere.

WALTER T. PEIRCE.

REFERENCES CITED

The following references are of record in the file of this patent:

UNITED STATES PATENTS

| Number | Name | Date |
| --- | --- | --- |
| 1,528,537 | Draemann | Mar. 3, 1925 |
| 1,610,954 | Lamplough | Dec. 14, 1926 |
| 2,291,344 | Powell | July 28, 1942 |
| 2,316,149 | Bates | Apr. 13, 1943 |
| 2,373,816 | De Roche et al. | Apr. 17, 1945 |
| 2,426,341 | Canfield | Aug. 26, 1947 |
| 2,446,620 | Swallow et al. | Aug. 10, 1948 |